(12) United States Patent
Mann et al.

(10) Patent No.: US 9,624,390 B2
(45) Date of Patent: Apr. 18, 2017

(54) INKJET PRINTING ON DYED SYNTHETIC FABRICS

(71) Applicant: Kornit Digital Ltd., Rosh HaAyin (IL)

(72) Inventors: Jacob Mann, Zoran (IL); Jacob Mozel, Kfar-Saba (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 14/994,344

(22) Filed: Jan. 13, 2016

(65) Prior Publication Data

US 2016/0207329 A1 Jul. 21, 2016

Related U.S. Application Data

(60) Provisional application No. 62/103,768, filed on Jan. 15, 2015.

(51) Int. Cl.
*B41J 2/015* (2006.01)
*C09D 11/107* (2014.01)
*C09D 11/30* (2014.01)
*C09D 11/10* (2014.01)

(52) U.S. Cl.
CPC ............ *C09D 11/107* (2013.01); *C09D 11/10* (2013.01); *C09D 11/30* (2013.01)

(58) Field of Classification Search
CPC ....... C09D 11/10; C09D 11/107; C09D 11/30; D06P 3/241; D06P 1/52; D06P 5/30; B41J 3/4078
USPC ..... 347/21, 100; 8/917, 918, 922; 427/389.9
See application file for complete search history.

(56) References Cited

U.S. PATENT DOCUMENTS 5,221,288 A * 6/1993 Kamada .................. D06P 1/004
8/918
2012/0327156 A1* 12/2012 Aruga .................... B41J 3/4078
347/20

* cited by examiner

*Primary Examiner* — Jannelle M Lebron (57) ABSTRACT

A process and a kit for inkjet printing high resolution color and stretchable images on dyed synthetic substrates are provided.

18 Claims, 1 Drawing Sheet

INKJET PRINTING ON DYED SYNTHETIC FABRICS

RELATED APPLICATION

This application claims the benefit of priority under 35 USC 119(e) of U.S. Provisional Patent Application No. 62/103,768 filed Jan. 15, 2015, the contents of which are incorporated herein by reference in their entirety.

FIELD AND BACKGROUND OF THE INVENTION

The present invention, in some embodiments thereof, relates to inkjet printing techniques and, more particularly, but not exclusively, to improved processes and compositions for inkjet printing of high resolution color and stretchable images on a dyed synthetic textile substrate.

Polyester fabrics are used widely for preparing sport apparel, and are very popular as dry-fit garments. The polyester fibers which are intrinsically colorless or white are dyed using dispersed dyes. The technique of introducing dyes into the polyester fibers is effected by heating the fabric in aqueous dispersion of the dye at elevated temperatures raging 90-150° C. At the elevated temperatures the polyester fibers are loosed while the dye enters the fibers' polymer and on cooling remains entangled therein.

Inkjet printing on polyester-based fabrics is widely recognized as limited by dye migration or bleeding, which occurs in polyester garments when a dispersed dye in the polyester fiber is heated to temperatures in excess of 130° C., causing the dye entanglement process to reverse and the dye to migrate, a phenomenon known as dye migration or vagrant dye, which is assumed to involve dye sublimation. When plastisol-based inks, used in screen-printing, and inkjet ink compositions (typically aqueous-based pigment dispersed in acrylic emulsion, and/or styrene acrylic emulsion, and/or PVC acrylic emulsion and/or polyurethane emulsion), are heated post-printing to temperatures higher than 130° C., (most inks are cured at 130-160° C.), these dyes are released into the ink causing a discoloration of the cured ink, while higher temperatures cause more severe migration. Film-forming inks are the most affected since they act, when heated, as a media for the diffusion (migration) dye molecules, which diffuse (migrate) through the ink film even after it has been cured (dye molecules can even migrate to the surface of ink through air). This dye migration effect is more damaging with clear gel prints or solid white prints.

U.S. Pat. Nos. 3,940,247, 3,957,427, 4,132,522, 4,758,243, 5,350,530, 5,733,341, 5,773,372, 6,331,352, 7,320,712, 8,349,427 and 8,859,461, which are incorporated herein by reference as if fully set forth herein, teach various methods for controlling dye migration in synthetic fabrics such as polyester.

A technology of synthesizing nylon and polyester with acidic functional groups as part of the polymer strands has been developed in the last decades. The existence of acidic functional groups enables dyeing of nylon, lycra and polyester fibers and fabrics, while reacting chemically cationic dyes with the acidic groups attached to the fibers polymers.

However, the problem of dye migration is still present even when printing on polyester fabrics dyed with cationic dyes, presumably since water-based inkjet compositions are typically basic, and the basic species in the inks may displace the cationic dye, leading to dye migration.

A family of dispersed pigment-based digital inks, suitable for printing on dark and/or light colored, absorptive and/or stretchable fabrics, as well as inkjet printing methodologies for printing images on such substrates, have been disclosed in, for example, U.S. Patent Application Nos. 20040252173, 20070103528, 20070103529, 20070104899, 20110032304, 20120040148 and 20140036014, U.S. Pat. No. 8,540,358 and International Patent Application Nos. WO 2005/115089, WO 2005/115761, WO 2014/076705 and WO 2011/018786, each of which being incorporated by reference as if fully set forth herein. These ink compositions and printing processes are based on a chemical and/or physical property of the ink components, which can be selected so as to coagulate or precipitate upon contact with another substance on the surface of the substrate. In some of the aforementioned dispersed pigment-based digital inkjet ink composition, the immobilization is afforded by using an acidic immobilization composition, while the subsequent step comprises printing a colored ink composition which is basic and sensitive to the acidic condition now effected on the substrate, such that the dispersed pigment coagulates and becomes immobilized until it is cured be heat. This coagulate or precipitate, or otherwise immobilization of the ink droplet, affords several major achievements—the ink is not absorbed by the substrate in case of textile and other absorptive materials, hence there is very minimal penetration and crossing-over of ink into the fabric and its back-side; the droplets preserve their original size and shape of microscopic droplets by not spreading over and/or into the substrate, thereby affording a sharper image and better color definition; and the ink forms a film over the substrate, which once cured can be selected so as to be stretchable and breathing, allowing the formation of a digital image on a stretchable substrate without sacrificing any of the color image quality even after it has been pulled and stretched. This family of ink compositions transformed the garment industry by allowing the manufacturer to use any non-pretreated fabric at any scale, including in "roll-to-roll" printing machines (continuous substrate printing machines), while not sacrificing the color gamut and image resolution which have been previously achievable only by dye-based digital inks.

SUMMARY OF THE INVENTION

The present inventors have surprisingly uncovered that printing and heat-curing an image by direct inkjet printing process on a textile substrate made of a dyed synthetic (polyester) material that exhibits negatively charged (anionic) groups, can be carried out successfully while applying to the substrate or a portion thereof an acidic wetting composition that comprises, for example, a transitory acid, subsequently inkjet printing an image using a basic colored inkjet composition on the wetted surface or portion thereof, and subsequently curing the image.

The present inventors have shown that using such a methodology, no dye migration occurs upon curing the image.

Embodiments of the present invention therefore provide a solution to the long-felt need of inkjet printing an image on a dyed synthetic substrate, such as polyester, while circumventing the dye migration phenomenon associated with such a printing, using common methodologies.

Embodiment of the present invention relate to a method of inkjet printing an image on a dyed synthetic textile substrate, the method is effected by:

modifying a synthetic textile so as to exhibit negatively charged functional groups thereon so as to obtain a modified synthetic textile substrate;

dying the modified synthetic textile substrate so as to obtain a dyed modified synthetic textile substrate;

contacting at least a portion of a surface of the modified substrate with an immobilization composition which comprises an acid, to thereby obtain a wet portion of the modified substrate;

inkjet printing a colored ink composition and/or an opaque white underbase ink composition directly on the wet portion to thereby form the image; and curing the image.

According to an aspect of some embodiments of the present invention, there is provided a method of inkjet printing an image on a dyed synthetic textile substrate which has been modified so as to exhibit negatively charged functional groups thereon and has been dyed, the method comprising:

contacting at least a portion of a surface of the modified substrate with an immobilization composition which comprises an acid, to thereby obtain a wet portion of the modified substrate;

inkjet printing a colored ink composition and/or an opaque white underbase ink composition directly on the wet portion to thereby form the image; and curing the image at 130-160° C.

According to some embodiments of the invention, the dyed synthetic textile substrate comprises a cationic dyestuff.

According to some embodiments of the invention, the synthetic textile substrate comprises a polymer selected from the group consisting of a polyester, a polyamide, an aromatic polyamide, a polyacrylate and any combination thereof.

According to some embodiments of the invention, the synthetic textile substrate is selected from the group consisting of a polyester fabric, a nylon fabric, a rayon fabric, an acetate fabric, a spandex fabric, a lycra fabric, a latex fabric, an aramid fabric and any combination thereof.

According to some embodiments of the invention, the synthetic textile substrate comprises a polyester.

According to some embodiments of the invention, the immobilization composition is having a pH of less than 6.5.

According to some embodiments of the invention, the immobilization composition comprises a transitory acid.

According to some embodiments of the invention, each of the colored ink composition and/or the opaque white underbase ink composition is having a pH of more than 7.5.

According to some embodiments of the invention, a relative migration of the dye is less than 20% as compared to an image printed using an immobilization composition having a neutral pH and assessed by Lab* analysis.

According to an aspect of some embodiments of the present invention, there is provided an inkjet ink kit for inkjet printing an image on a dyed synthetic textile substrate, packaged in a packaging material and identified in print, in or on the packaging material, for use in printing an image on a dyed synthetic textile substrate, and comprising:

an immobilization composition having a pH of less than 6.5;

a colored ink composition; and optionally an opaque white underbase ink composition and/or a spot color composition.

According to some embodiments of the invention, the immobilization composition comprises an acid.

According to some embodiments of the invention, the immobilization composition comprises a transitory acid.

According to some embodiments of the invention, each of the colored ink composition and/or the opaque white underbase ink composition is having a pH of more than 7.5.

According to some embodiments of the invention, the dyed synthetic textile substrate comprises a cationic dyestuff.

According to some embodiments of the invention, the synthetic textile substrate comprises a polymer selected from the group consisting of a polyester, a polyamide, an aromatic polyamide, a polyacrylate and any combination thereof.

According to some embodiments of the invention, the synthetic textile substrate is selected from the group consisting of a polyester fabric, a nylon fabric, a rayon fabric, an acetate fabric, a spandex fabric, a lycra fabric, a latex fabric, an aramid fabric and any combination thereof.

According to some embodiments of the invention, the synthetic textile substrate comprises a polyester.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to inkjet printing techniques and, more particularly, but not exclusively, to improved processes and compositions for inkjet printing of high resolution color and stretchable images on a dyed synthetic textile substrate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

While attempting to mitigate the problems associated with printing aqueous-based inks directly on dyed synthetic fabrics, such as dyed polyester fabrics, the present inventors have surprisingly found that applying a wetting composition comprising an acid on a synthetic polyester fabric, modified to exhibit negatively charged functional groups, such as sulfonate groups, prior to printing an image thereon allows subsequent printing of basic aqueous-based inks free of the aforementioned dye migration. The present inventors have further surprisingly uncovered that the printing can be effected while utilizing an ink composition having a pH higher than 7.5 (a basic aqueous-based ink composition).

As can be seen in the Examples section that follows, the application of an acidic immobilization composition not only immobilized the colored ink composition which was printed thereafter, but also mitigated the problem of dye migration into the cured ink composition after the curing step.

Without being limited by any particular theory, it is assumed that the cationic dye is expected to be displaced by the basic species of the aqueous-based inks, yet that this phenomenon is prevented by using the acidic immobilization composition.

Embodiments of the present invention therefore provide a novel methodology for inkjet printing images on dyed synthetic textile substrates as described herein, while using aqueous-based basic ink compositions, and while mitigating the problem of dye migration upon curing.

Modified Synthetic Fabric:

As used herein, the term "modified synthetic fiber" or "modified synthetic fabric" describes synthetic polymeric material, such as polyester (such as, for example, polyethylene terephthalate), polyamide, aromatic polyamide (such as, for example, aramid), polyacrylate (acrylic), nylon, rayon, acetate, spandex, lycra and latex and mixtures thereof, which are manufactured so as to exhibit charged functional groups, typically negatively charged functional groups, in the polymeric chains either during the polymerization process (by introducing co-monomers) or by post-polymerization modification processes.

In the context of embodiments of the present invention, the term "negatively charged functional group" or "anionic functional group" refers to a chemical moiety which exhibits a negative charge in aqueous media. Negatively charged functional groups include, without limitation, sulfonate, phosphate, phosphonate and carboxylates, while other known anionic functional groups are contemplated within the scope of some embodiments of the present invention.

U.S. Pat. Nos. 7,842,630, 3,664,984, 4,661,116, 4,048, 149, 5,117,041, 5,279,899, 5,705,598, 6,576,716, 6,664,015, 6,818,723 and 8,846,599, which are incorporated herein by reference as if fully set forth herein, teach various modified synthetic fibers and fabrics based thereon.

According to some embodiments of the invention, the polyester has dicarboxylic acid repeat units selected from the group consisting of aromatic dicarboxylic acids having 4 to 16 carbon atoms, aliphatic dicarboxylic acids having 4 to 16 carbon atoms, cycloaliphatic dicarboxylic acids having 4 to 16 carbon atoms, and any mixtures thereof. Exemplary diacids include, without limitation, terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid and mixtures thereof.

According to some embodiments of the invention, the polyester has diol or glycol portion that are derived from the generic formula HO-G-OH where G is an aliphatic, cycloaliphatic or aromatic moiety of 2 to 18 carbon atoms. Exemplary diols or glycols include, without limitation, ethylene glycol, diethylene glycol, triethylene glycol, propane-1,3-diol, propane-1,2-diol, butane-1,4-diol, pentane-1,5-diol, hexane-1,6-diol, 1,4-cyclohexanedimethanol, 3-methylpentane-2,4-diol, 2-methylpentane1,4-diol, 2,2-diethyl-propane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl) propane, 2,2-bis-(4-hydroxypropoxyphenyl)ethane and mixtures thereof.

For example, melt blending polyester with certain alkyl metal sulfonates, and extruding the mixture into fibers, provides for polyester fibers or filaments with durable wettability and superior moisture management properties. Besides exhibiting anionic functional groups, such fibers offer desirable properties for garments and various apparel products. The alkyl metal sulfonates, in total, are present in the fabric in an amount from about 2% to about 5% by weight, based on the total weight of the polyester. For example, the alkyl metal sulfonates are present from about 2.5% to about 4.5%, from about 2.5% to about 5%, from about 2.5% to about 4%, from about 3% to about 4%, from about 3% to about 5%, or from about 3% to about 4.5%, based on the total weight of polyester. For instance, alkyl metal sulfonates are present at levels of about 2%, 3%, 4%, 5%, 6%, 7%, 8%, 9%, 10%, 12%, 15%, 20% or higher, based on the total weight of the polyester.

The incorporation of an alkyl metal sulfonate into a polyester fiber or filament, according to some embodiments of the present invention, results in observed improved wettability of these materials. This modification is also durable, such that the fibers or filaments and fabrics made therefrom do not lose their wettability upon aging or handling. The improved wettability is stable to repeated wear, without a loss of performance, even over extended periods of time.

For example, alkyl metal sulfonates are of the formula $RSO_3M$ where R is linear or branched alkyl chain having 4 to 16 carbon atoms, and M is Na, K or Li.

For another example, according to some embodiments of the present invention, polyesters are treated by contact either during or after polycondensation with about 0.1 to 25 weight percent, based on total weight of the composition, of a salt of an alkoxy benzene sulfonic acid at about 240-290° C. for about 10-120 minutes or more.

Salts of alkoxy benzene sulfonic acids included within the purview of embodiments of the present invention include, without limitation, 2-alkoxy-3,5-dihalo benzene sulfonic acid, 2-alkoxy-5-alkylbenzene sulfonic acid, 2-alkoxy-5-halobenzene sulfonic acid, 2-alkoxy-2,4,5-trihalobenzene sulfonic acid, 2-alkoxy-4,5-dimethylbenzene sulfonic acid, 2-alkoxybenzene sulfonic acid, 2-methoxy, 5-ethoxy benzene sulfonic acid and 2,5-dialkoxy benzene sulfonic acid.

These treated or modified synthetic fiber-based fabrics are typically dyed using cationic dyes (cationic dyestuff).

Commercially available dyed polyester filament/fiber is referred to in the field as "cationic polyester" since it is dyed using cationic polyester dyestuff. Because the existence of the sulfonic acid functional groups in/on the polymeric chains, the fiber more closely combines with the dye molecules (sulfonic acid functional groups has a strong affinity to the cationic dyeing material, also known as cationic dyestuff), and this affinity improves the dyeing performance of the fiber. Commercially available dyed polyester fibers are also referred to as Easy Cationic Dyeable Polyester fiber (ECDP) filament yarn. The dyed polyester filament (ECDP) is produced by boiling modified polyester at normal pressure with the cationic dyestuff, while maintaining a high dyeing rate and high dye absorption rate. The ECDP fiber and fabrics made therefrom can use the full color spectrum, as well as exhibiting good performance in soap dyeing, water washing, friction and color fastness.

The term "cationic dye" or "cationic dyestuff", as used herein, refers to a group of water soluble dyes which ionize into cationic ions in an aqueous solution. These cationic dyestuff are oftentimes used to dye synthetic fibers by forming ionic linkage with the acid groups on the fibers through the function of electric charge. Cationic dyestuffs are mainly used in the dyeing and printing of polypropylene fabrics and dyeing of modified polyester and polyacrylics fibers. Cationic dyestuff are described in, for example, U.S. Pat. Nos. 3,660,008, 3,741,982, 3,967,925, 4,192,648 and 5,178,950, which are incorporated herein by reference as if fully set forth herein.

Exemplary cationic (basic) dyestuffs suitable for the purposes of the present invention include, among others, Sevron Blue BGL (Basic Blue 35), Sevron Brilliant Red 35 (Basic Violet 15), Sevron Yellow 3RL (Basic Yellow 15), Sandocryl Blue B-36 (Basic Blue 3), Sandocryl Red B-3B (Basic Red 15), Sandocryl Yellow B4RL (Basic Yellow 32), Chrysodine C R (conc) (Basic Orange 1), Amacryl Brilliant Red 4G (Basic Red 14), Victoria Blue B (Basic Blue 26), Rhodamine B and the like.

Ink Composition:

As discussed hereinabove, digital inkjet compositions, particularly those used by high-end manufacturers which seek to produce high-resolution, high-gamut, durable yet soft and/or stretchable and/or wash-fasten inkjet printing on textile, are designed to coagulate on the substrate upon printing, thereby bestowing the abovementioned qualities of the finished product. According to some embodiments, such inkjet compositions can include at least a first composition (also referred to herein as an immobilization composition, as a wetting composition, or as a first part) and a second composition (also referred to herein as a colored ink composition, or as a second part), wherein the first composition comprises a property-adjusting agent and a first carrier, and the second composition comprises an emulsified property-sensitive agent, a colorant and a second carrier, whereas the second composition congeals or coagulates upon contact with the property-adjusting agent.

It is noted that the term "part" is used herein and throughout synonymously with the term "composition".

Such inkjet compositions, and/or parts, according to embodiments of the present invention, are formulated for forming an image in a form of a film attached to a surface of a substrate. In some embodiments, the ink composition is formulated to form an elastic film on the surface of the substrate, which is advantageous when printing on absorptive, stretchable and/or flexible substrates, such as textile made of synthetic fiber materials. Once all the compositions, or parts used for forming the final ink composition (that forms a printed image) converge on the substrate and the printing process is complete, a thin film, which constitutes the image, is formed on the substrate upon curing, typically by heating the film to 130-180° C., or 130-160° C. In some embodiments of the invention, the image is formed as an elastic film, an attribute which refers to the mechanical property and form of the image, as it is formed on the substrate from a polymerizable ink composition. This film is said to be elastic since it is formed substantially from elastomeric substances. It is noted that the film, according to some embodiments of the present invention, is at least as elastic as the substrate it is affixed to.

In order to obtain a sharp and vivid image in the form of a film, the film should be made from fine and distinct points of colors, which may be compared to pixels of a digital image or the grain of a photographic paper coated with light-sensitive chemicals. The distinct points of colors stem from very fine droplets of colored ink which are jetted onto the substrate during the printing process, and the finer the droplets remain on the substrate after ejection, the finer the image would be. The droplets will remain fine if feathering, bleeding and smearing can be limited. The way to afford a sharp image film on the substrate is to "freeze" or immobilize the droplets on contact with the substrate. Thus, a chemical and/or physical change takes effect in the ink composition upon contacting thereof with the substrate, and this chemical and/or physical change is effected by combining agents in the individual compositions, which are designed to afford the immobilization of the inkjet droplets on the substrate, eventually leading to better and sharper images. It is noted that this immobilization of the inkjet droplets on the substrate is unrelated to the type of substrate, and does not depend on nor require any pretreatment of the substrate.

The term "immobilization", as used in the context of embodiments of the present invention, refers to the act of restriction or substantial limitation of flowability of a liquid, namely substantial reduction of the capability of a liquid to move by flow. For example, immobilization of a liquid can be effected by congelation of the liquid or solutes therein. Immobilization of droplets of liquid ink can be achieved, for example, by elevating the viscosity of the liquid ink composition such that the droplets are restricted from flowing once in contact with the substrate. As used herein, the term "immobilization" is not meant to include final polymerization and print fixation by crosslinking and curing reactions.

Hence the chemical and/or physical change, according to some embodiments of the present invention, is congelation. The term "congelation", as used herein, is synonymous to the terms "coagulation", "thickening" or "gelation", and refer to the sharp decrease in fluidity of a formerly fluid liquid. Congelation can be effected also by sedimentation, precipitation, partial solidification and partial polymerization of soluble constituents in the composition.

According to some embodiments of the present invention, the inkjet compositions include an emulsified film-forming agent that can congeal on a substrate controllably so as to avoid bleeding of the ink composition. The ink composition then further polymerizes during drying/curing on the surface of the substrate without being absorbed therein, and becomes affixed to the substrate, thereby affording an image in the form of a flexible film, which can stay pliable and extendable as the stretchable substrate at normal temperatures of everyday life.

In order to effect congelation upon contact with the substrate and not before, the final ink composition, which forms the image, is formed from at least two separate parts or individual compositions which combine only upon contact with the substrate. The two parts or compositions cross-react with each other since one part contains a property-sensitive agent and the other contains a property-adjusting agent, and the cross-reaction between the two parts or compositions effects the congelation. In general, the objective of using an ink composition containing a property-sensitive agent in one part or composition and a property-adjusting agent in a separate part or composition, is to provide the means to congeal and thereby immobilize the final ink composition only on the surface of the substrate and not beforehand, thus avoiding clogging of the delicate elements of the printheads. The property-adjusting agent is selected such that it effects a change in the property-sensitive agent only upon allowing contact therebetween, and thereby effects congelation in the combined, final ink composition.

The phrase "property-adjusting agent" as used herein refers to a component in a part of an ink composition and can effect the level of one or more chemical or physical properties of other parts of the composition when these compatible parts come in contact and combine, such as a pH level, metal-ion-ligand complexation, dispersibility, the ionic strength, the hydrophobicity or the electric charge/valency of the combined composition. By effecting a change in one or more such properties, the property-adjusting agent is causing the property-sensitive agent to undergo congelation, as discussed herein.

The term "property-sensitive agent" refers to a component of a composition which is sensitive to a change in a particular chemical and/or physical property of the composition and as a result of such a change undergoes a chemical and/or physical change which effects the entire composition. Such sensitivity can manifest itself by, for example, the loss of its ability to stay as an emulsion, an event that leads to congelation.

The term "property" as used herein refers to a chemical and/or physical property of the ink composition, namely, a characteristic of the composition that is reflected by the chemical composition and/or a physical parameter of the composition. Representative examples include, without limitation, acidity (pH), metal atom complexation, dispensability, dispersibility, solubility, ionic strength, hydrophobicity, electric charge and the likes.

The term "pH" refers to the quantitative measure of the acidity or alkalinity (basicity) of liquid solutions. It is noted that some property-sensitive film-forming agents become pH-sensitive only in the presence of certain metal oxides.

It is noted that some film-forming agents will be stable in various conditions, such as low pH, but will congeal if a certain metal oxide is present in the emulsion. Hence according to some embodiments of the present invention, the second part of the ink composition further includes a metal oxide.

The phrase "metal ion complexation", as used herein, refers to the ability of some functional groups in certain substances, to act as ligands which bind to some metal atoms in a coordinative manner so as to form a metal-ligand complex. Such complexation may alter the chemical characteristics of these substances and render them more or less susceptible to chemical changes in their environment. It is noted that some property-sensitive film-forming agents are sensitive to this property without the need of a change in the pH of the medium.

The phrase "ionic strength" as used herein refers to the charge-weighted concentration of ions in solutions.

The term "hydrophobicity" as used herein refers to a quality of a non-polar molecule or group that has little affinity to water or other polar solvents. Hydrophobic groups on molecules in a polar solution tend to turn in on them or clump together with other hydrophobic groups.

The term "dispersibility" as used herein refers to the amount of a dispersed or emulsified species that will disperse in a specific carrier under given conditions. The reduction of dispersibility may be effected by a change in another chemical property such as pH, ionic strength, hydrophobicity or otherwise causing collapse of the dispersion or emulsion.

The aforementioned properties may be inter-dependent, namely a change in one property effects a change in another property, thereby constituting inter-dependency therebetween. An example of such inter-dependency is a pH-dependent dispersibility and ionic-strength-dependent dispersibility, wherein the change in pH (the aforementioned acidity or alkalinity property) or the ionic-strength of a solution changes the dispersibility of one or more of its dispersed species.

Similarly, there exist inter-dependency between metal ion complexation combined with pH, and the capacity to stay emulsified (dispersed), and such interdependency is discussed in detailed hereinbelow.

According to other embodiments of the present invention, the chemical property is pH, and the corresponding property-adjusting agent is an acid. Although most acids will cause a pH-sensitive agent to congeal, only some acids will be suitable for an ink composition, which is formulated for inkjet printing, particularly on textile application.

One exemplary acidic property-adjusting agent is an organic acid. According to some embodiments, the organic acid is a carboxylic acid. Suitable organic acids include, but are not limited to a carbonic acid, a formic acid, an acetic acid, a propionic acid, a butanoic acid, an α-hydroxy acid such as glycolic acid and lactic acid, a halogenated derivative thereof and any combination thereof.

The selection of a suitable property-adjusting agent in the form of an acid should take into account several factors, namely the corrosive nature of acids on the fabric as well as on the delicate parts of the printing apparatus and particularly the printheads and other metallic and otherwise delicate parts of the printing machine which corrode easily, as well as the tendency of acids to scorch and degrade certain substrate materials over time. Hence, the acid should be effective enough to cause the desired property-adjusting effect, mild enough so as not to generate damage to the machinery and/or garment, and transitory so as not to degrade the finished product.

According to some embodiments of the present invention, acids which may be neutralized by heat such as the heat effected during the curing step, are jointly referred to herein as transitory acids. Hence, the phrase "transitory acid", as used herein, refers to an acid which can be rid of by the virtue of being volatile or intra/cross-reactive to form essentially neutral species.

While evaporation is one mechanism by which heat can reduce the presence of a volatile acid, heat can also reduce acidity in other ways. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

It is noted herein that in general alpha-hydroxy acids are suitable as a transitory acid according to some embodiments of the present invention.

For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie know as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione and other products of cross-reactivity.

Transitoriness is required when it is desirable to have little or no traces of an acid in the final product. Therefore acid traces should be reduced before or during the curing step of the process (effected typically at 130-160° C.), and can no longer damage the substrate or promote dye migration from a dyed substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the workers health which may be adversely effected by highly volatile acid such as formic acid. In addition, some volatile acids cause noxious or unpleasant odor even if minute reminiscence thereof is left in the finished product. Some volatile acids leave a distinct and mostly unpleasant odor, and therefore should be disfavored as noxious odor may affect the work place as well as cause malodor of the product at the end-user side. Hence, an odorless volatile or otherwise transitory organic acid should be selected when possible.

Exemplary transitory organic acids which can provide all the above advantages with minimal disadvantages include, but are not limited to, lactic acid and glycolic acid.

Hence according to some embodiments, the acid is glycolic acid or lactic acid. The acid may be buffered by a weak amine such as tris(hydroxymethyl aminomethane), also referred to as Tris or THAM.

According to some embodiments, an acidic immobilization composition (first part; wetting composition) may be buffered by a suitable salt or weak base, such as ammonia/ammonium base or another volatile amine, to ensure full extraction of any traces of acid or base in the printed image.

According to some embodiments of the present invention, the first part or composition of an ink composition as described herein is formulated with a first carrier (solvent) and used to carry and deliver a property-adjusting agent, and does not contain a colorant and is thus substantially transparent and colorless, and intended not to leave a distinguishable mark on the substrate. It is the property-adjusting agent that affects a property-sensitive agent in a second color-containing part or composition and other optional parts of, or compositions composing, the final ink composition, thereby effecting congelation of the combined parts or compositions. Hence, the first part or composition of the ink composition, which includes a property-adjusting agent, is also referred to herein interchangeably as the immobilization part or composition. The second part of, or composition composing, the ink composition, comprises a colorant, a second carrier and a property-sensitive agent in the form of, for example, an emulsified resin, which will congeal on the surface of the substrate due to an interaction between the parts (e.g., an interaction induced by the property-adjusting agent).

According to some embodiments of the present invention, the property-sensitive agent can be a film-forming polymerizable agent, which is soluble/dispersible/emulsifiable when present in the ink composition and may also act as a dispersing agent for the various pigment colorants which are included in some parts of the ink composition. This pigment dispersing agent, can be the property-sensitive agent that congeals when, for example, a transition metal oxide is added and/or the pH or the ionic strength of the media it is dissolved in crosses a certain level. Hence, according to some embodiments of the present invention, the film-forming attribute and the property-sensitive attribute are combined in a dispersant of pigments and other colorants. However, it is noted that the property-sensitive agent is not required to disperse the pigment or be associated thereto in any form other than being present in the same part of the ink composition.

A typical colorant in inkjet ink compositions is a dispersed pigment. As found by the present inventors, the property-sensitive agent according to embodiments of the present invention, is not necessarily involved with the colorant, may it be a dispersed pigment, a dissolved dye or combinations thereof. Therefore, this property-sensitive agent can serve its purpose in the context of embodiments of the present invention without reference to the colorant, as opposed to some ink compositions known in the art, where the colorant in a dispersed pigment and the pigment's dispersant is sensitive to pH or other effectors. For example, according to some embodiments of the present invention, such dispersants are acrylic salts (salts of an acrylic acid monomer), which lose their dispersing attribute and become immiscible or insoluble as a result of a pH-shift, and precipitates.

For example, a property-sensitive agent, such as a pH/metal-ion-sensitive acrylic polymer or copolymer, can lose its ability to stay in an emulsified form, possibly due to formation of metal-complexation species when the pH of the liquid formulation drops below a certain level and/or when a certain metal ion or metal oxide is introduced, thus effecting congelation of the combined ink composition and in practice effects the immobilization of the colorant which is present therein. Hence, according to some embodiments, the property-sensitive agent does not serve as a dispersant for the pigments, but rather affects the dispersability of the pigments in an indirect fashion by congealing and thus immobilizing the pigments as well.

The basic process colorants in liquid ink compositions are required to be transparent or translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer is printed on the substrate before the translucent colored part (second part) is printed. This opaque underbase layer is afforded by a third part or composition, which combines with the first, second or other parts or compositions to form of the printed image, according to some embodiments of the present invention.

According to some embodiments, the ink composition further includes a third part or a third composition, which comprises an emulsified property-sensitive agent, which can be a proto-elastomeric film-forming agent, an opaque colorant in the form of a second metal oxide, as this phrase is defined hereinbelow, and a third carrier.

The third part or composition therefore includes an opaque and lightly-colored pigment colorant. It is noted that the opaque and lightly-colored opaque pigment colorant is white, affording an opaque white layer when jetted on a darkly-colored or non-white surface. It is further noted that the white opaque pigment is suitable-sized particles of a second metal oxide, such as, for example, titania.

It is further noted that the the ink composition, according to some embodiments of the present invention, is suitable for inkjet printing of "spot" colorants, which are substantially opaque colored inks. Spot colorant can be jetted like any other transparent "process" colorants, and are typically used to generate special effects in order to afford highlights and emphases over the image usually in pre-defined coloration.

According to some embodiments of the present invention, a fourth part or a fourth composition, which comprises an emulsified property-sensitive agent, a second metal oxide which is substantially opaque, a colorant and a fourth carrier, is combined with other compositions or parts, as described herein, into the final ink composition that forms the printed image.

The table below presents the various parts or compositions composing the ink composition which forms a printed image, according to some embodiments of the present invention, and lists their alternative names used herein, their function and some of their principle ingredients. It is noted that the wetting composition, which is discussed in details hereinbelow in the context of a process for printing the image, may be regarded as another part of the composition albeit it is not necessarily applied on the substrate by digital means or an inkjet printhead.

Table 1 below presents an exemplary ink composition, describing some of the names, properties, functions and ingredients of each part of thereof.

TABLE 1

| General term | Alternative term and characteristics | Function | Some of the principal ingredients and properties |
|---|---|---|---|
| Immobilization composition or Wetting composition (First part) | Immobilization part; Generally transparent/colorless; Typically applied by more massive spraying and can further be manipulated mechanically by squeegee or roller or printed before or concurrently with the other parts and after the wetting composition | Provides the property-adjusting agent, namely the constituent that causes the ink part that contains the property-sensitive agent to congeal on contact Optionally provides some of the proto-elastomeric film forming agent(s) and to flatten protruding fibers, smooth and even the surface before fine droplets are printed thereon | A property-adjusting agent (e.g. an acid); A carrier (e.g. water); An optional polymerizable resin (e.g. an acrylic mixture) Typically acidic (pH 2.3-4.2) |
| Colored ink composition (Second part) | Colored part; Translucent color part; Generally transparent and colored by CMYK basic colors; Typically printed after and over the first part | Provides the colorants for the design/image which are dispersed in a property-sensitive dispersant that congeals upon contact with the first part; May include some proto-elastomeric film forming agent(s) | A dispersed translucent colorant; A carrier (e.g. water); A property-sensitive polymerizable dispersant (e.g. an acrylate); An optional additional polymerizable resin (e.g. an acrylic mixture); A polymerization catalyst; A crosslinking agent; Typically basic (pH 8.3-8.6) |
| Colored ink composition (Third part) | Underbase part; Opaque white part; Generally opaque and white; Typically printed after and over the first part and before the second part. | Provides a solid opaque white background to the translucent colors when printed on a non-white substrate; May include some proto-elastomeric film forming agent(s) | A dispersed opaque colorant (e.g. a metal oxide); A carrier (e.g. water); A property-sensitive polymerizable dispersant (e.g. an acrylate); An optional additional polymerizable resin (e.g. an acrylic mixture); A polymerization catalyst; A crosslinking agent; Typically basic |
| Colored ink composition (Fourth part) | Spot color part; Opaque colored part; Typically printed after and over the second part | Provides a "non-process" solid opaque colored highlights of color over the design/image; May include some proto-elastomeric film forming agent(s) | A dispersed opaque colorant (e.g. a metal oxide); A dispersed translucent colorant; A carrier (e.g. water); A property-sensitive polymerizable dispersant (e.g. an acrylate); |

TABLE 1-continued

| General term | Alternative term and characteristics | Function | Some of the principal ingredients and properties |
|---|---|---|---|
| | | | An optional additional polymerizable resin (e.g. an acrylic mixture); A polymerization catalyst; A crosslinking agent; Typically basic |

The action of immobilization by congelation of the ink composition is effected upon the abovementioned chemical or physical property change caused by the property-adjusting agent that is delivered concomitantly with the property-sensitive agent. Hence, at minimum, an ink composition may comprise at least a first part (an immobilization part) and a second part (a colored part), whereas the second part congeals upon contact with the first part when the first part and the second part converge on the substrate during the direct ink application (printing) process. This instant immobilization by congelation of the jetted droplets subsequently promotes improved color and detail resolution of the image, as well as improved contact between the colorant(s) in the ink composition and the substrate, which is effected by better adhesion of the medium containing the colorant (pigment and/or dye) therein to the substrate.

The binding and adhesion of the medium containing the colorant may be effected by, for example, direct heat-activated chemical crosslinking or entanglement of the (optionally proto-elastomeric) polymerizable components in the ink composition with functional groups in the substrate.

In general, the content of the various compositions forming the final ink composition which forms the printed image, according to embodiments of the present invention, may vary according to the type of substrate and the specific requirements of the final printed product, yet each serve the same principles as follows. The carrier is selected to provide a medium for mixing, suspending and/or dissolving the other components of the ink composition, and is required to be volatile and benign. The colorant is selected to achieve the desirable color and other physical and chemical properties, and be suitable for a given printing machine, printheads and printing technology. The various film-forming binders and adhesion promoting agents (which can be selected to be proto-elastomeric), as well as their activating and catalyzing counterparts, when needed, are selected so as to afford the adhesion of the colorants to the surface of the substrate in a substantially irreversible manner, at least in the sense of normal use of the final product as well as capable of forming an elastic film, and therefore should provide sustainability, stretchability and flexibility of the image on the product in wash, dry and reasonable wear and tear.

According to some embodiments of any aspect and embodiment of the present invention, the process, composition and system presented herein are effective and useful for continuous (roll-to-roll) as well as discrete (single piece) substrates that have been pretreated with a property-adjusting agent or a property-sensitive agent in a separate process, that takes place before the direct printing process has begun. The pretreated substrate may be still wet by a composition comprising the property-adjusting agent or the property-sensitive agent, for wet on wet application, or pre-dried prior to loading the substrate onto the printing machine.

The inkjet ink composition according to some embodiments of the present invention, are formulated so as to be suitable for use in an inkjet printing process, including continuous printing processes wherein the substrate is provided as a very long (tens, hundreds and thousands of meter long) continuous sheet. Some of these printing processes are referred to herein and in the art as roll-to-roll printing, and such roll-to-roll printing processes are typically based on the use of an adhesive blanket in the form of an adhesive conveyor belt to affix and convey the substrate through the printing system during the printing process.

According to some embodiments, the ink composition is a congealing ink composition, namely an ink composition that loses its fluidity upon contact between various components or parts thereof.

Following are exemplary general formulation for each of the parts of the ink composition according to some embodiments of the present invention.

Exemplary formulations of the first part (the immobilization composition), according to some embodiments are based on the following percentage of content and attribute ranges:

| | |
|---|---|
| A property-adjusting agent | 4-20%; |
| A proto-elastomeric binder (optional) | 0-40%; |
| Humectants | 45-55%; |
| Buffering agent | 1-4%; |
| Anti-corrosion agent for iron | 0.1-2%; |
| Copper/Aluminum anti corrosive agent | 0.1-2% |
| Other additives | 0-5%; |
| Deionized water | to 100%; |
| Viscosity at 34° C. | 9-12 cp; |
| pH | 4.2-5.0; and |
| Surface tension | 25-40 N/m. |

The property-adjusting agent can be, for example, a transitory organic acid acting as a pH-adjusting agent. In such cases, the organic acid content in the immobilization part ranges from 4% to 20%, and the water content of the immobilization part ranges respectively to the content of the acid.

The optional proto-elastomeric binder (which is not property-sensitive) may be an acrylic emulsion, styrene acrylic emulsion, urethane emulsion, PVP or PVA included in the formulation in an amount of 4-40% to achieve better adherence of the pigments and also to assist in flattening the loose fibers of a textile substrate.

According to some embodiments, in cases where the property-adjusting agent is a transitory organic acid it is present in the formulation of the first part in 6-12%, a proto-elastomeric acrylic binder is present in about 5-15% humectants 10-30% and deionized water make up to 100%. The organic acid is a volatile organic (formic acid or acetic acid) acid such as lactic, glycolic or propionic acid (otherwise transitory), with the latter used as a suitable odorless and transitory organic acid.

Following the exemplary first part, an exemplary and corresponding formulation of the second part of the ink composition (the colored ink composition) is based on the following percentage of content ranges:

| | |
|---|---|
| A dispersed colorant (pigment) mixture | 10-20% |
| Property-sensitive pigment dispersing film forming agent | 25-30%; |
| Humectants (glycol mixture) | 20-40%; |
| Amino resin crosslinking agent | 2-4%; |
| Bactericide/Fungicide | 0.1-1%; |
| Blocked acid catalyst | 1-1.5%; |
| Buffering agent | 0.2-0.6%; |
| Defoamer | 0.1-0.6%; |
| Wetting agent/surfactant | 0.1-2%; |
| Organic solvent | 0-5%; |
| Other additives | 0-2%; |
| Deionized water | to 100%; |
| Viscosity at 34° C. | 10-13 cp; |
| pH | 8-8.5; and |
| Surface tension | 25-36 N/m. |

An amino resin crosslinking agent, such as melamine or urea resin, or a formaldehyde-free crosslinking agent, according to some embodiments of the present invention, can be used as a crosslinking agent.

The colorant is typically a dispersion of 20% pigment in water and a suitable dispersant. The viscosity is measured for shear force range at 1-4000 $sec^{-1}$.

The second part of the ink composition may be buffered to be alkaline (basic) so as to maintain the property-sensitive dispersing agent in its emulsified form.

The third part of the ink composition (the underbase part) is similar to the formulation of the second part with some variations with respect to the dispersant, the pigment and the proto-elastomeric binder which together can be regarded as a property-sensitive proto-elastomeric film-forming system, and is therefore based on the following percentage of content ranges:

| | |
|---|---|
| Second metal oxide (acting also as colorant) | 15-20% |
| Property-sensitive colorant dispersing film forming agent | 25-45% |
| Proto-elastomeric film-forming agent (optional) | 15-25% |
| Dispersant (optional) | 1-6% |
| Bacteriocide/Fungicide | 0.1-0.5%; |
| Humectants | 30-45%; |
| Defoamer | 0.2-0.4%; |
| Buffering agent | 0.1-0.2%; |
| Wetting agent/surfactant | 0.1-0.5%; |
| Organic solvent | 0-5%; |
| Other additives | 0-10%; |
| Deionized water | to 100%; |
| Viscosity at 34° C. | 12-14 cp; |
| pH | 8-8.5; and |
| Surface tension | 25-36 N/m. |

The ink compositions, according to embodiments of the present invention, are utilized most effectively by a unique process for printing on dyed synthetic substrates as presented in details hereinbelow. The process presented herein was practiced successfully with outstanding results, as demonstrated in the Examples section that follows.

It is noted that since the immobilization effect occurs instantaneously upon contact between the first and the second or third parts, each of the parts of the multi-parts ink composition should be dispensed and jetted from completely separated and designated printhead systems, so as to prevent premature immobilization of the ink composition and keep it substantially liquid at all steps of the process before curing, at least up to the point where the composition is positioned desirably on the surface of the substrate.

A Method of Printing:

In some embodiments, the synthetic fabric is provided modified so as to exhibit negatively charged functional groups, and provided as a dyed substrate.

In some embodiments, prior to the printing process, the synthetic fabric is modified so as to exhibit negatively charged functional groups, and subsequently the modified substrate is dyed.

According to some embodiments, the substrate is dyed using a cationic dyestuff.

According to some embodiments, the substrate is a modified dyed synthetic fabric, and the process of directly printing a color image thereon by a digital inkjet printing technique is effected by applying (spraying or inkjet printing) an immobilization composition as described herein on the dyed substrate, inkjet printing one or more colored ink composition(s) directly on the part of the substrate which has been wetted by the immobilization composition, optionally printing other compositions on the wetted substrate (underbase composition and/or spot color composition, as described herein), and curing the film constituting the image on the substrate typically at a temperature higher than 130° C., or higher than 150° C., or even higher.

According to some embodiments, the immobilization composition is acidic, having a pH of less than 6.5, less than 6, less than 5.5, less than 5, less than 4.5 or less than 4.

According to some embodiments, the colored ink composition and/or the opaque white underbase composition and/or the spot color composition are each basic, having a pH of more than 7.5, more than 8, more than 8.5 or more than 9.

Typically, the image quality in terms of dye migration can be assessed after curing can be analyzed and assessed using Lab* (CIELAB) values. CIELAB is a color measuring system that shows uniform color spacing in three values. CIELAB is based on the theory that retinal color stimuli are translated between the optical nerve and the brain into distinctions between light and dark, red and green, and blue and yellow. CIELAB indicates these values with three orthogonal axes: L*, a*, and b*. The central vertical axis represents lightness (signified as L*) whose values run from 0 (black) to 100 (white). The color axes are based on the fact that a color can't be both red and green, or both blue and yellow, because these colors oppose each other. On each axis the values run from positive to negative. On the a* axis, positive values indicate amounts of red while negative values indicate amounts of green. On the b* axis, yellow is positive and blue is negative. For both axes, zero is neutral gray. Therefore, values are only needed for two color axes and for the lightness or grayscale axis (L*), which is separate.

For example, "pure white" has 100, 0, 0 respective Lab* values, and any deviation therefrom is indicative of deviation from the intended "pure white". If a substrate is dyed with a red dye, for example, the dye migration can be assessed by printing a white image thereon, and measuring the deviation from L*=100 and a*=0, whereas an image exhibiting red dye migration therein will exhibit L* value smaller than 100 and a* larger than 0. These deviations can be compared to Lab* values obtained from an image that was printed with a neutral wetting composition and the difference in the deviations in both images can be expressed in percent deviation, and used to indicate the rate of relative dye migration.

Hence, according to some embodiments of the present invention, a migration of the dye into an image printed on a dyed synthetic substrate using an acidic wetting (immobilization) composition, compared to an image printed using a neutral wetting composition is less than 100%, less than 90%, less than 80%, less than 70%, less than 60%, less than 50%, less than 40%, less than 30%, less than 20% or less than 10%, as assessed by comparative Lab* analysis.

A Kit for Printing:

According to an aspect of some embodiments of the present invention, there is provided a kit for printing an image on a dyed synthetic substrate, packaged in a packaging material and identified in print, in or on the packaging material, for use in printing an image on a dyed synthetic textile substrate.

The kit further includes:

an immobilization composition, as described herein;

At least one of a colored ink composition, an opaque white underbase composition and/or a spot color composition, as described herein; and instructions to apply the immobilization composition on at least a portion of the dyed synthetic substrate; and digitally print the image in that portion of the substrate using any one of the colored ink composition, an opaque white underbase composition and/or a spot color composition; and cure the image by heating to, for example, about 130-180° C., or to about 130-160° C.

It is expected that during the life of a patent maturing from this application many relevant methods for inkjet printing an image on a dyed polyester fabric will be developed and the scope of the term "inkjet printing an image on a dyed polyester fabric" is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Inkjet Printing on a Dyed Polyester Fabric

To demonstrate the ability to print basic inkjet ink composition on a modified and dyed polyester (cationic polyester) fabric without having the dye migrate into the film of the image, a basic opaque white underbase ink composition having a pH ranging from 8.3 to 8.6 was used to form an inkjet-printed white square over a modified polyester fabric sample dyed red with a cationic dyestuff.

The modified and dyed polyester (cationic polyester) was chosen from commercially available garments, which included, without limitation, Sport-Tek® PosiCharge™, A4 Block Performance and Port Authority® Silk Touch™.

Red dye has been chosen for this demonstration since it is the most migratable and/or most conspicuous when migrating from the fabric to the ink printed on the fabric. The reason for red being the most migratable dye is its lowest set temperature, making it the first to sublimate when the temperature rises. It is noted that other polyester dyes can sublimate albeit at slightly higher temperatures than the red dye.

The formulation and attributes of the immobilization composition (first part of the ink composition which contains the property-adjusting agent) is presented below in Table 2 and the basic opaque white underbase ink composition in Table 3.

TABLE 2

| Acidic immobilization composition | |
|---|---|
| Property-adjusting lactic acid | 9% |
| Ammonia (for buffering the acid) | 3% |
| A mixture of propylene glycol, diethylene glycol, glycerin and/or other polyols (as humectants) | 50% |

TABLE 2-continued

| Acidic immobilization composition | |
|---|---|
| Benzotriazole (as anti cupper corrosion agent) | 0.40% |
| Sodium nitrate (as anti corrosion agent for ferrous metals) | 0.20% |
| Acrylic emulsion (film-forming binder) Appretan E 6200 (Tg −20° C.) | 35% |
| Deionized water | to 100% |
| Viscosity at 34° C. | 10 cp |
| pH | 4.7 |
| Surface tension | 37 N/m |

TABLE 3

| Opaque white underbase composition | |
|---|---|
| Property sensitive film-forming acrylic emulsion (Appretan E 6200, Tg −20° C.) | 37% |
| Titania (as an opaque white pigment and second metal oxide) | 18% |
| A mixture of propylene glycol, diethylene glycol and glycerin (as humectants) | 37% |
| TEGO 750 (dispersant) | 3.2% |
| BYK 024 (as an anti-foaming agent) | 0.2% |
| Diethanolamine (as a buffering agent) | 0.2% |
| BYK 348 (as a wetting agent/surfactant) | 0.1% |
| Cymel 303 (amino resin crosslinking agent) | 3% |
| Nacure 2448 (a blocked acidic catalyst) | 0.5% |
| Acticide MBS (as a bacteriocide/fungicide) | 0.1% |
| Deionized water | to 100% |
| Viscosity at 34° C. (at shear force of 4000 sec$^{-1}$) | 13 cp |
| pH | 8.5 |
| Surface tension | 34 N/m |

White ink was used since white is the most affected by dye migration and most suitable background color to measure tinting and discoloration.

The white ink was applied using an inkjet printing machine on two types of samples, one being a red dyed polyester fabric which has been wetted by spraying or printing thereon a neutral wetting composition having a pH of about 7, and another being the red dyed polyester fabric which has been wetted by spraying or printing thereon an acidic wetting composition having a pH of about 4.7. Both samples were cured at 150° C. to set the white ink.

It is noted that the fabric was wetted using the same amount of wetting composition applied at the same rate and over the same area, and further that the white ink was applied at the same density over the same area of wetted fabric.

Figure 1:
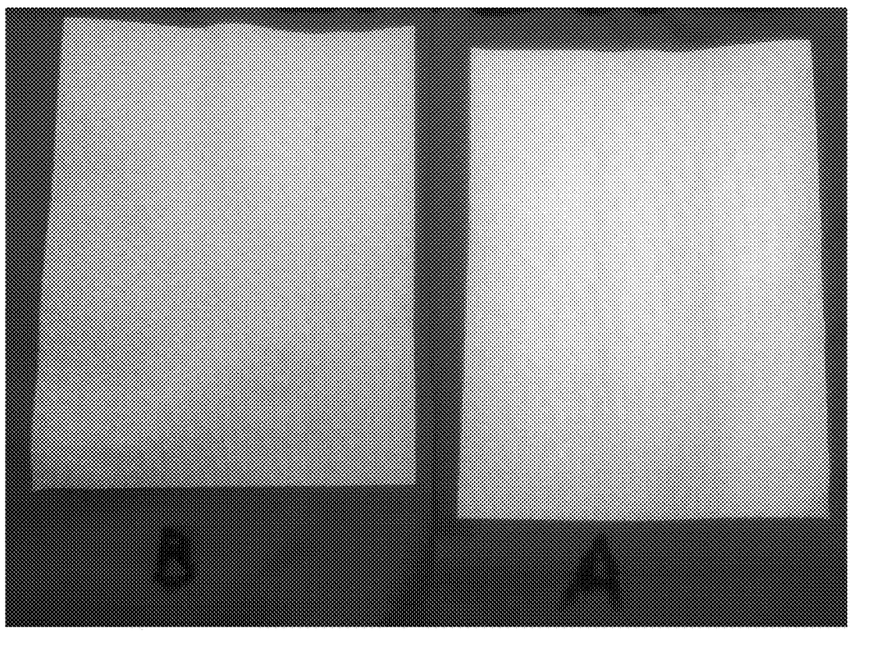
FIG. 1 presents a color photograph of red-dyed polyester fabric samples having a white square printed thereon using a basic inkjet white ink composition (pH 8.3-8.6), being printed after the fabric has been wetted with a neutral wetting composition (marked by the letter B under the printed square) or with an acidic wetting composition (marked by the letter A under the printed square).

FIG. 1 presents a color photograph of red-dyed polyester fabric samples having a white square printed thereon using a basic inkjet white ink composition (pH 8.3-8.6), being printed after the fabric has been wetted with a neutral wetting composition (marked by the letter B under the printed square) or with an acidic wetting composition (marked by the letter A under the printed square).

As can be seen in FIG. 1, the printed square that was printed on a pre-wetted sample using a neutral wetting composition appears pink due to excessive dye migration which occurred during the curing step, while the printed square that was printed on a pre-wetted sample using an acidic wetting composition appears to be white.

After curing, both samples were analyzed using a color detector probe for measuring Lab* (CIELAB) values.

Table 4 presents the results of the Lab* (CIELAB) measurements conducted at three different locations (sample points) on the white square which was printed over the wetted fabric and subsequently cured at 150° C.

TABLE 4

| Parameter | Sample A Treated with acidic immobilization solution | | | Sample B Treated with neutral immobilization solution | | |
|---|---|---|---|---|---|---|
| | L | a | b | L | a | b |
| Sample point 1 | 78.5 | 15.3 | −1.3 | 69.2 | 24.4 | 2.9 |
| Sample point 2 | 78.5 | 14.6 | −1.5 | 67.1 | 26.4 | 3.1 |
| Sample point 3 | 77.4 | 14.9 | −1.1 | 68.5 | 24.8 | 2.5 |
| AVERAGE | 78.13 | 14.93 | −1.30 | 68.27 | 25.20 | 2.83 |

As can be seen in Table 4, the relatively lower value of L* measured for Sample B (treated with a neutral wetting composition) is a clear indication that the sample is less bright (darker) and thus less white, compared to Sample A (treated with an acidic wetting composition). Furthermore, the relatively higher a* measured for the B sample is a clear indication that the red dye infiltrated the white underbase ink composition after curing compared to Sample A, thus it is clear that the sample which has been printed white over an acidic wetting composition resulted in a whiter image. In quantitative terms Sample A is about 70% brighter (average deviation from L*=100) and 60% less red (average deviation from a*=0) than Sample B.

Thus, it can be said that the dye migration in Sample A is less than about 60% as assessed by Lab* analysis.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of inkjet printing an image on a dyed synthetic textile substrate, the method comprising:

modifying a synthetic textile so as to exhibit negatively charged functional groups thereon so as to obtain a modified synthetic textile substrate;

dying said modified synthetic textile substrate so as to obtain a dyed modified synthetic textile substrate;

contacting at least a portion of a surface of said modified substrate with an immobilization composition which comprises an acid, to thereby obtain a wet portion of said modified substrate;

inkjet printing a colored ink composition and/or an opaque white underbase ink composition directly on said wet portion to thereby form the image; and curing the image.

2. The method of claim 1, wherein said dyed synthetic textile substrate comprises a cationic dyestuff.

3. The method of claim wherein said synthetic textile substrate comprises a polymer selected from the group consisting of a polyester, a polyamide, an aromatic polyamide, a polyacrylate and any combination thereof.

4. The method of claim 3, wherein said synthetic textile substrate comprises a polyester.

5. The method of claim 1, wherein said synthetic textile substrate is selected from the group consisting of a polyester fabric, a nylon fabric, a rayon fabric, an acetate fabric, a spandex fabric, a lycra fabric, a latex fabric, an aramid fabric and any combination thereof.

6. The method of claim 1, wherein said immobilization composition is having a pH of less than 6.5.

7. The method of claim 6, wherein said immobilization composition comprises a transitory acid.

8. The method of claim 1, wherein each of said colored ink composition and/or said opaque white underbase ink composition is having a pH of more than 7.5.

9. The method of claim 1, wherein a relative migration of said dye is less than 20% as compared to an image printed using an immobilization composition having a neutral pH and assessed by Lab* analysis.

10. A method of inkjet printing an image on a dyed synthetic textile substrate which has been modified so as to exhibit negatively charged functional groups thereon and has been dyed, the method comprising:
contacting at least a portion of a surface of said modified substrate with an immobilization composition which comprises an acid, to thereby obtain a wet portion of said modified substrate;
inkjet printing a colored ink composition and/or an opaque white underbase ink composition directly on said wet portion to thereby form the image; and
curing the image at 130-180° C.

11. The method of claim 10, wherein said dyed synthetic textile substrate comprises a cationic dyestuff.

12. The method of claim 11, wherein said synthetic textile substrate comprises a polymer selected from the group consisting of a polyester, a polyamide, an aromatic polyamide, a polyacrylate and any combination thereof.

13. The method of claim 12, wherein said synthetic textile substrate comprises a polyester.

14. The method of claim 10, wherein said synthetic textile substrate is selected from the group consisting of a polyester fabric, a nylon fabric, a rayon fabric, an acetate fabric, a spandex fabric, a lycra fabric, a latex fabric, an aramid fabric and any combination thereof.

15. The method of claim 10, wherein said immobilization composition is having a pH of less than 6.5.

16. The method of claim 15, wherein said immobilization composition comprises a transitory acid.

17. The method of claim 10, wherein each of said colored ink composition and/or said opaque white underbase ink composition is having a pH of more than 7.5.

18. The method of claim 10, wherein a relative migration of said dye is less than 20% as compared to an image printed using an immobilization composition having a neutral pH and assessed by Lab* analysis.

* * * * *